May 15, 1962 A. L. KOUP 3,034,748
TAXI-DRIVE FOR LANDING WHEELS
Filed Aug. 31, 1961 2 Sheets-Sheet 1

INVENTOR.
ALFRED L. KOUP
BY
ATTORNEY

May 15, 1962 A. L. KOUP 3,034,748
TAXI-DRIVE FOR LANDING WHEELS
Filed Aug. 31, 1961 2 Sheets-Sheet 2

INVENTOR.
ALFRED L. KOUP
BY
ATTORNEY 3,034,748
TAXI-DRIVE FOR LANDING WHEELS
Alfred L. Koup, Sandy Hook, Conn., assignor, by mesne assignments, to the United States of America as represented by the Secretary of the Navy
Filed Aug. 31, 1961, Ser. No. 135,385
3 Claims. (Cl. 244—50)

This application is a continuation-in-part of application Serial Number 744,887, filed June 26, 1958 and now abandoned which is a division of application Serial Number 565,520 filed February 14, 1956, and now United States Patent No. 2,869,662.

This invention relates to auxilliary drive systems for ground maneuvering aircraft and particularly helicopters.

The rotor blades of a helicopter, when in a flight position, occupy an inordinately large space. As a result, for storage of the helicopter on shipboard or in a camouflage area, it is advantageous to fold the rotor blades along the helicopter's fuselage configuration. In this condition, less space is occupied, but the helicopter is unable to move, under its own power, into or out of the parking space and reliance must be made on ground crews and towing equipment for ground maneuvering the helicopter.

Furthermore, though the parking space is sufficiently large to store the helicopter with its rotor blades ready for flight, if it is taxied under its rotor power, there is a large consumption of fuel that makes the movement very costly.

As a consequence, it is an object of this invention to provide a drive system for a helicopter which will enable it to taxi with its rotors in a folded condition.

A further object of this invention is to provide a taxi-drive system for a helicopter having dependent or independent control for each wheel in a forward or reverse direction.

Still another object is to provide a taxi-drive system which is electrically controlled.

These and other objects of the invention will be readily apparent to those skilled in the art from a perusal of the following description taken in connection with the accompanying drawing wherein.

Figure 1:
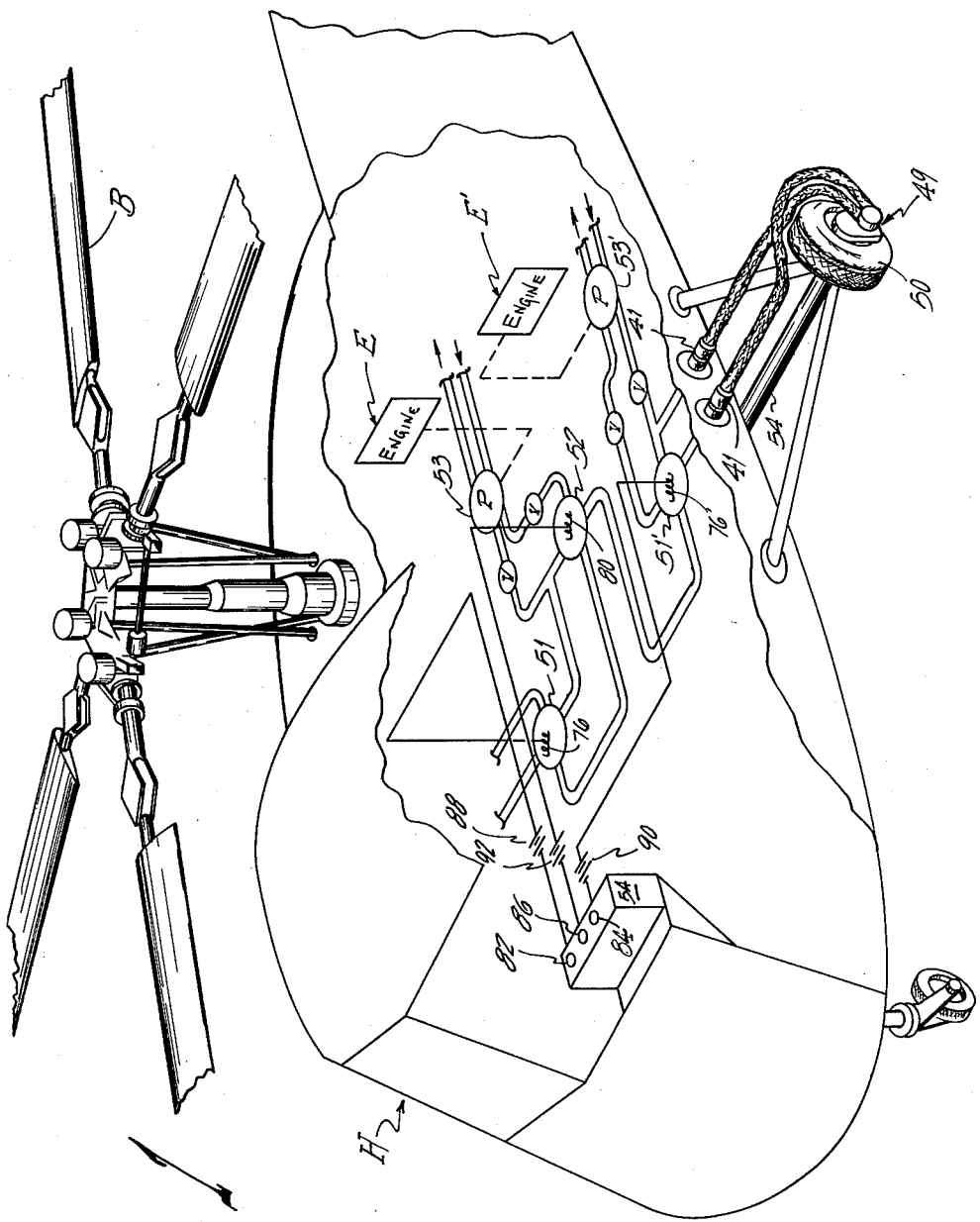
FIGURE 1 shows a part of a helicopter employing the invention.
Figure 2:
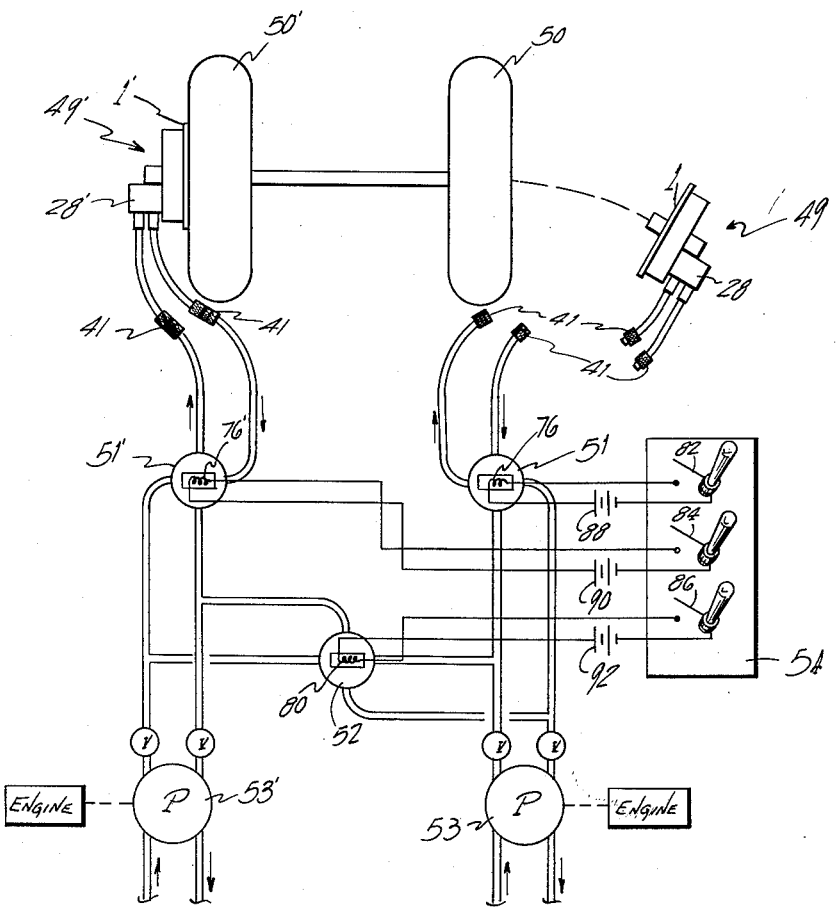
FIGURE 2 is a schematic layout of the invention removed from the helicopter and showing its relation to the landing gear.

Referring to the drawing, the letter H indicates a helicopter having dual engines E and E', shown in block form, which are used to turn the rotor blades B. The helicopter has a pair of main landing wheels, 50 and 50', rotatable on a fixed axle 54 and there is a wheel drive assembly 49 or 49' removably attached to an end of axle 54 and drivingly coupled to the outboard side of wheel 50 or 50'. Each of the latter assemblies has a fluid motor, 28 or 28', and a drive unit, 1 or 1'. The fluid motor powers the drive unit which in turn rotates the landing wheel.

The before-mentioned United States Patent No. 2,869,662 shows a preferred construction of a wheel drive assembly and the manner of coupling it for operable use; however, other types having a drive unit adapted to be drivingly connected to a landing wheel and driven by a fluid motor may be employed.

Each motor, 28 or 28', is connected to a pump, 53 or 53', through a 4-way valve, 51 or 51' by a supply and return line or conduit. A quick disconnect coupling, 41, of conventional design is provided in each of the conduits near the fluid motors, 28 and 28', so that the drive assemblies, 49 and 49', may be removed from the landing wheels. Solenoids or the like, 76 and 76', are associated with the valves 51 and 51', respectively, to control the operation thereof. Also connecting each pair of supply and return lines is a dual shut-off valve 52 having a solenoid type operator 80 associated with it.

The control panel 54 for the three control valves is of the three-switch type. Thus, switches 82 and 84 on the panel 54 control the 4-way valves 51 and 51' while switch 86 controls the dual shut-off valve 52. Batteries 88, 90 and 92 provide a source of electrical power for the switching circuits.

All the elements, such as the valves, conduits, engines, etc., are installed within the aircraft, with the exception of the drives 1 and 1', the fluid motors 28 and 28', and the detachable couplings 41. The control panel is conveniently mounted in the pilot's compartment within his reach.

The pumps 53 and 53' are of the constant delivery type and are shown as being separately driven by one of the helicopter's engines E or E'. Therefore, in the ordinary operation of the pumps to drive the landing gear wheels 50 and 50', control of the engine speed also results in control in the output of the pumps.

Since the engines E and E' do not turn the rotor while taxiing under the influence of the invention, their fuel consumption is relatively low. However, it should be appreciated that the engines E and E' may be replaced with smaller, internal combustion units, having no rotor turning capabilities, in order to further reduce the fuel consumption.

In use, for ground maneuvering a helicopter employing the invention, the wheel drive assemblies 49 and 49' are attached to the landing wheels 50 and 50' and the return and supply lines are joined to the fluid motors 28 and 28' by quick disconnect couplings 41.

Control of the taxi-drive is obtained through control of either the fluid motor or the hydraulic pumps. In the fluid motor control, a 4-way valve is positioned in each motor circuit; one valve is controlled by switch 82 and the other by switch 84. Thus, by manipulating the switches 82 and/or 84, the direction of rotation of the wheels can be controlled as each taxi-drive system can be operated in either direction by reversing the position of the 4-way valves.

Switch number 86 operates the shut-off valve 52 which can be kept in the open or closed position. During one engine operation, the valve is opened and the pump associated with that engine will operate both circuits and both fluid motors. As illustrated, either engine may be cut off and the other will operate the circuits with the shut-off valve open.

During two engine operation, valve 52 may be opened or closed. If open, the operation of each motor is related to the other since the pressure and return lines are interconnected. If closed, each motor is independent of the other and steering is accomplished by varying the throttle setting of either engine. Since the pump is directly connected to the engine, a change in the throttle setting of the engine produces a direct change in the output of the pump.

The recommended method for steering is to vary the throttle settings of the engines with the dual shut-off valve closed. Since both wheels are now operating independently of each other, the plane can be made to taxi directly forward or in reverse and also perform turns to the right or left at all speeds and turning radii. Turning may also be performed by braking one wheel to a complete or partial stop and the helicopter will turn using the braked wheel as a pivot. In the event that the braking turn is utilized, a relief valve on the braked wheel discharges preventing a build-up of pressure in the system.

After the aircraft has been maneuvered into the desired position the wheel drive assemblies 49 and 49' may be removed.

Obviously many modifications and variations on the invention are possible in the light of the above teachings. It is, therefore, to be understood that within the scope of the appended claims the invention may be practiced otherwise than as specifically described.

What is claimed is:

1. A hydraulic drive system for a pair of landing wheels of a helicopter or the like comprising a drive assembly for each of said wheels adapted for detachable connection thereto including a drive unit for driving connection to said wheels and a fluid motor for powering of said drive unit, a supply and return conduit for pressurized fluid connected to each of said fluid motors, a pump connected to each of said supply and return conduits for supplying each of said fluid motors with pressurized fluid, a variable speed engine drivingly connected to each of said pumps for selectively varying the pressure of the pressurized fluid supplied to each of said fluid motors to thereby selectively vary the speed of each of said fluid motors, a 4-way valve carried in each pair of said supply and return conduits and being movable between a plurality of controlling positions to reverse the flow of fluid in each of said pair of supply and return conduits to thereby reverse the direction of rotation of said landing wheels, an electrical-type actuator associated with each of said 4-way valves for selectively controlling the movement thereof between said plurality of controlling positions, conduit means interconnecting said pairs of supply and return conduits intermediate said pumps and said 4-way valves, valve means carried in said interconnecting conduit means and being movable between open and closed positions to control the flow of fluid between said pairs of supply and return conduits, and an electrical-type actuator associated with said valve means for controlling the movement thereof between said open and closed positions whereby said fluid motors may be either separately and independently driven by each of said pumps or may be simultaneously driven by one or both of said pumps.

2. A hydraulic drive system as claimed in claim 1 wherein said electrical-type actuators associated with said 4-way valves and said valve means carried in said interconnecting conduit means are comprised of solenoids.

3. A hydraulic drive system as claimed in claim 1 wherein a check valve is carried in each of said supply and return conduits intermediate each of said pumps and said interconnecting conduit means.

References Cited in the file of this patent

UNITED STATES PATENTS

| | | |
|---|---|---|
| 2,103,530 | Henry | Dec. 28, 1937 |
| 2,381,109 | Cartlidge | Aug. 7, 1945 |
| 2,514,822 | Wolfe | July 11, 1950 |
| 2,804,016 | Moore | Aug. 27, 1957 |